(12) United States Patent
Hough et al.

(10) Patent No.: US 9,670,327 B2
(45) Date of Patent: Jun. 6, 2017

(54) POLYMER COMPOSITION

(71) Applicant: LANXESS Deutschland GmbH, Cologne (DE)

(72) Inventors: Philip Hough, Grevenbicht (NL); Martin Van Duin, Sittard (NL)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 15/116,253

(22) PCT Filed: Jan. 30, 2015

(86) PCT No.: PCT/EP2015/051973
§ 371 (c)(1),
(2) Date: Aug. 3, 2016

(87) PCT Pub. No.: WO2015/117900
PCT Pub. Date: Aug. 13, 2015

(65) Prior Publication Data
US 2016/0340481 A1 Nov. 24, 2016

(30) Foreign Application Priority Data

Feb. 5, 2014 (EP) .................................... 14153991

(51) Int. Cl.
| | |
|---|---|
| C08F 2/44 | (2006.01) |
| C08F 2/08 | (2006.01) |
| C08J 3/24 | (2006.01) |
| C08L 21/00 | (2006.01) |
| C08J 3/22 | (2006.01) |
| C08L 9/00 | (2006.01) |
| C08K 3/22 | (2006.01) |

(52) U.S. Cl.
CPC ................. *C08J 3/24* (2013.01); *C08J 3/226* (2013.01); *C08L 9/00* (2013.01); *C08L 21/00* (2013.01); *C08J 2309/00* (2013.01); *C08J 2321/00* (2013.01); *C08J 2409/00* (2013.01); *C08J 2461/06* (2013.01); *C08K 2003/2227* (2013.01); *C08L 2205/025* (2013.01); *C08L 2205/03* (2013.01); *C08L 2207/04* (2013.01)

(58) Field of Classification Search
CPC ........ C08L 21/00; C08L 9/00; C08L 2205/03; C08L 2205/025; C08L 2207/04; C08J 3/226; C08J 3/24; C08J 2461/06; C08J 2409/00; C08J 2321/00; C08J 2309/00; C08K 2003/2227
USPC .................................................. 524/849, 856
See application file for complete search history.

(56) References Cited

U.S. PATENT DOCUMENTS

| | | | |
|---|---|---|---|
| 3,036,986 A | | 5/1962 | O'Connor et al. |
| 3,341,488 A | * | 9/1967 | O'Connor .............. C08G 18/00 523/211 |
| 7,378,467 B2 | | 5/2008 | Yan |
| 7,563,748 B2 | | 7/2009 | Pompeo et al. |
| 2012/0225963 A1 | | 9/2012 | Duin et al. |
| 2013/0274360 A1 | | 10/2013 | Hough et al. |

OTHER PUBLICATIONS

European Search Report from European Application No. 14153991, dated Aug. 22, 2014, two pages.

\* cited by examiner

*Primary Examiner* — William Cheung

(57) ABSTRACT

Polymer composition containing a) a polymer, b) a zeolite, whereby the total amount of the components a) and b) in the composition is higher than 90 wt %, in particular higher than 94 wt %, more preferred higher than 98 wt % and the total amount of water determined by TGA in the temperature range of 25 to 380° C. with a rate of 5° C./min is lower than 15 wt %, based on the amount of residuals obtained after the TGA measurement has been continued to 550° C.

10 Claims, No Drawings

POLYMER COMPOSITION

This application is a National Stage Entry of International Application No. PCT/EP2015/051973, filed Jan. 30, 2015, and claims the benefit of and priority to European Patent Application No. 14153991.6, filed Feb. 5, 2014, all of which are incorporated herein by reference in their entirety.

The present invention relates to an polymer composition, a process for its manufacturing and its use for vulcanizing a resin containing vulcanizable polymer composition.

As known from EP2441798 and EP2650327 zeolite is used to improve cure rates as well as state of cure of resin cross-linker in vulcanizable rubber compositions. To achieve these desired benefits zeolite is used in an activated form, mostly by a drying treatment to remove moisture or other volatiles that may deactivate the zeolite. Such a treatment requires certain conditions and equipment that may not be available at all customers who simply want to apply this technology. Hence, it was an object of the present invention to find a way of how to provide zeolite for the vulcanization reaction without losing too much of its activity to get reproducible good curing results.

This objective is achieved by providing a polymer composition containing
  a) a polymer and
  b) a zeolite,
whereby the total amount of the components a) and b) in the composition is higher than 90 wt %, in particular higher than 94 wt %, more preferred higher than 98 wt % and the total amount of water determined as by TGA in the temperature range of 25 to 380° C. with a rate of 5° C./min is lower than 15 wt %, based on the amount of residuals obtained after the TGA measurement has been continued to 550° C.

Polymer:

The polymer of the component a) may be a thermoplastic, an elastomeric polymer or a mixture thereof.

As thermoplastic polymer in particular ethylene-based polymers, like high-ethylene polymers, such as high-density polyethylene (HDPE), low-density polyethylene (LDPE), linear, low-density polyethylene (LLDPE) and very-low-density polyethylene (VLDPE), and co-polymers of ethylene with butylene, hexene and octene (EBM, EHM and EOM plastomers), as well as propylene-based polymers like polypropylene or copolymers of propylene with ethylene (PEM) or a mixture thereof is preferred.

Preferably the polymer of the component a) is an elastomeric polymer of the type R rubber. The R rubber before being vulcanized preferably contains unsaturated rubbers designated as R rubbers according to DIN/ISO 1629. These rubbers have an unsaturation in the main chain and might contain unsaturations in the side chain in addition to the unsaturated main chain.

The R rubbers include, for example: Natural rubber (NR), Polyisoprene rubber (IR), Styrene-butadiene rubber (SBR), Polybutadiene rubber (BR), Nitrile rubber (NBR), Butyl rubber (IIR), Brominated isobutylene-isoprene copolymers preferably with bromine contents of 0.1 to 10 wt. % (BIIR), Chlorinated isobutylene-isoprene copolymers preferably with chlorine contents of 0.1 to 10 wt. % (CIIR), Hydrogenated or partially hydrogenated nitrile rubber (HNBR), Styrene-butadiene-acrylonitrile rubber (SNBR), Styrene-isoprene-butadiene rubber (SIBR) and Polychloroprene (CR) or mixtures thereof.

Another preferred polymer of the component a) is an elastomeric polymer of the type M rubber. The M rubber includes for example ethylene propylene diene rubber (EPDM), chlorinated polyethylene (CM), chlorosulfonated rubber CSM, ethylene propylene copolymer (EPM), ethylene vinyl acetate rubber (EVM), silicone rubber (QM), fluoro elastomer (FKM) and ethylene acrylate rubber (AEM).

The elastomeric polymer of the M rubber mentioned type in the rubber composition according to the present invention can naturally be modified by further functional groups. In particular, elastomeric polymers that are functionalized by hydroxyl, carboxyl, anhydride, amino, amido and/or epoxy groups are more preferred. Functional groups can be introduced directly during polymerization by means of copolymerization with suitable co-monomers or after polymerization by means of polymer modification.

In one preferred embodiment of the invention, the elastomeric polymer is Natural rubber (NR), Polybutadiene rubber (BR), Nitrile rubber (NBR), Hydrogenated or partially hydrogenated nitrile rubber (HNBR), Styrene-butadiene rubber (SBR), Styrene-isoprene-butadiene rubber (SIBR), Butyl rubber (IIR), Polychloroprene (CR), ethylene propylene diene rubber (EPDM), chlorinated polyethylene (CM), chlorosulfonated rubber (CSM), Chlorinated isobutylene-isoprene copolymers, in particular with chlorine contents of 0.1 to 10 wt. % (CIIR), Brominated isobutylene-isoprene copolymers in particular with bromine contents of 0.1 to 10 wt. % (BIIR), Polyisoprene rubber (IR), (EPM), ethylene vinyl acetate rubber (EVM), silicone rubber (QM), fluoro elastomer (FKM), ethylene acrylate rubber (AEM) or a mixture thereof.

In a further preferred embodiment of the invention, the elastomeric polymer comprises 1,1-disubstituted or 1,2-trisubstituted carbon-carbon double bonds. Such di- and trisubstituted structures react especially satisfactorily with a phenol formaldehyde resin cross-linker according to the invention.

The elastomeric polymer preferably has a Mooney viscosity (ML (1+4), 125° C.) in the range of 10 to 150 MU, particularly preferred of 30 to 80 MU (ISO 289-1:2005).

In another preferred embodiment of the present invention the elastomeric polymer preferably has a Mooney viscosity (ML (1+4), 125° C.) in the range of 10 to 50 MU, particularly preferred of 30 to 30 MU (ISO 289-1:2005).

Preferred elastomeric polymers are M rubbers that are copolymers of ethylene, one or more $C_3$ to $C_{23}$ α-olefins and a polyene monomer. Copolymers of ethylene, propylene and a polyene monomer are most preferred (EPDM). Other α-olefins suitable to form a copolymer include 1-butene, 1-pentene, 1-hexene, 1-octene and styrene, branched chain α-olefins such as 4-methylbut-1-ene, 5-methylpent-1-ene, 6-methylhept-1-ene, or mixtures of said α-olefins.

The polyene monomer may be selected from non-conjugated dienes and trienes. The copolymerization of diene or triene monomers allows introduction of one or more unsaturated bonds.

The non-conjugated diene monomer preferably has from 5 to 14 carbon atoms. Preferably, the diene monomer is characterized by the presence of a vinyl or norbornene group in its structure and can include cyclic and bicyclo compounds. Representative diene monomers include 1,4-hexadiene, 1,4-cyclohexadiene, 1,5-hexadiene, 1,6-heptadiene, 1,7-octadiene, dicyclopentadiene, 5-ethylidene-2-norbornene, 5-vinyl-2-norbornene, 5-methylene-2-norbornene, 1,5-heptadiene, and 1,6-octadiene. The copolymer may comprise a mixture of more than one diene monomer. Preferred non-conjugated diene monomers for preparing a copolymer are 1,4-hexadiene (HD), dicyclopentadiene (DCPD), 5-ethylidene-2-norbornene (ENB) and 5-vinyl-2-norbornene (VNB). ENB is the most preferred polyene.

The triene monomer will have at least two non-conjugated double bonds, and up to about 30 carbon atoms. Typical triene monomers useful in the copolymer of the invention are 1-isopropylidene-3,4,7,7-tetrahydroindene, 1-isopropylidene-dicyclo-pentadiene, dihydro-isodicyclopentadiene, 2-(2-methylene-4-methyl-3-pentenyl) [2.2.1] bicyclo-5-heptene, 5,9-dimethyl-1,4,8-decatriene, 6,10-dimethyl-1,5,9-undecatriene, 4-ethylidene-6,7-dimethyl-1,6-octadiene and 3,4,8-trimethyl-1,4,7-nonatriene.

Ethylene-propylene or higher α-olefin copolymers preferably comprise about 10 to 90 wt. %, preferably 30 to 90 wt. %, more preferably 40 to 80 wt %, in particular 45 to 75 wt. % ethylene derived units, 0.01 to 20 wt. %, preferably 0.5 to 15 wt. %, or more preferably 1 to 10 wt. % polyene-derived units, wherein preferably the balance to 100 wt. % is the amount of the $C_3$ to $C_{23}$ α-olefin derived units.

A preferred elastomer is an ethylene α-olefin diene rubber obtainable by random copolymerization of ethylene, an α-olefin having 2 to 23 carbon atoms, in particular propylene and a diene selected from the group consisting of 1,4-hexadiene (HD), dicyclopentadiene (DCPD), 5-ethylidene-2-norbornene (ENB) and 5-vinyl-2-norbornene (VNB), in particular ENB or VNB or ENB and VNB.

A strongly preferred elastomeric polymer is an ethylene propylene diene rubber copolymerized by 45 to 75 wt. % of ethylene, 1 to 10 wt. % diene, in particular ENB, and the balance is propylene.

A single EPDM or an EPDM blend is preferred having a Mooney viscosity (1+4) at 125° C. of 20 to 24 MU and having an amount of 3 to 6 wt % ENB.

Another preferred elastomeric polymer in the present invention is butyl rubber which is the type of synthetic rubber made by copolymerizing an iso-olefin with a minor proportion of a polyene having from 4 to 14 carbon atoms per molecule. The iso-olefins generally have from 4 to 7 carbon atoms, and such iso-olefins as isobutylene or ethyl methyl ethylene are preferred. The polyene usually is an aliphatic conjugated diolefin having from 4 to 6 carbon atoms, and is preferably isoprene or butadiene. Other suitable diolefins that may be mentioned are such compounds as piperylene; 2,3-dimethyl butadiene-1,3; 1,2-dimethyl butadiene-1,3; 1,3-dimethyl butadiene-1,3; 1-methyl butadiene-1,3 and 1,4-dimethyl butadiene-1,3. The butyl rubber contains only relatively small amounts of copolymerized diene, typically about 0.5 to 5 wt. %, and seldom more than 10 wt. %, on the total weight of the elastomer. For the sake of convenience and brevity, the various possible synthetic rubbers within this class will be designated generally by the term butyl rubber.

A preferred butyl rubber is a isobutylene-isoprene copolymer having a Mooney viscosity ML (1+8) at 125° C. of 40 to 60. Preferably such a butyl rubber has a density of 0.89 to 0.94 g/cm$^3$ and an unsaturation level of 1.85+/−0.2 mol %.

Further preferred elastomeric polymer in the present invention are especially natural rubber and its synthetic counterpart polyisoprene rubber.

The polymer composition according to the invention may also comprise polymers other than the above described elastomeric polymer. Such polymers include polyethylene, polypropylene, propylene ethylene rubber (EPM), copolymers of ethylene and butylene, hexylene or octylene, acrylic polymer (e.g. poly(meta)acrylic acid alkyl ester, etc.), polyvinyl chloride, ethylene-vinyl acetate copolymers, polyvinyl acetate, polyamide, polyester, chlorinated polyethylene, urethane polymers, styrene polymers, silicone polymers, styrene-ethylene-butylen styrene block copolymers (SEBS), and epoxy resins.

Zeolite:

The zeolite as contained in the thermoplastic elastomer composition of the present invention may be those natural or synthetic crystalline alumina-silicate microporous materials having a three-dimensional porous structure. The zeolites can be clearly distinguished by their chemical composition and crystalline structure as determined by X-ray diffraction patterns. Zeolite has already been used in resole cured rubbers for accelerating the curing rates as mentioned in EP2441798.

Possible zeolites are already mentioned in Kirk-Othmer Encyclopedia of Chemical Technology.

Due to the presence of alumina, zeolites exhibit a negatively charged framework, which is counter-balanced by positive cations. These cations can be exchanged affecting pore size and adsorption characteristics. Preferred are the potassium, sodium and calcium forms of zeolite A types. Preferred zeolites having pore openings of approximately 2 to 10 Ångstrom. In particular the zeolite A having a pore opening of 2 to 10 Ångstrom, in particular from 3 to 6 Ångstrom is preferred. Preferred are approximately 3, 4 and 5 Ångstrom respectively. Consequently they are called Zeolite 3A, 4A and 5A. The metal cation might also be ion exchanged with protons.

Further not limiting examples of synthetic zeolites are the zeolite X types and zeolite Y types which are well known to the man skilled in the art. Not limiting examples for naturally occurring zeolites are mordenite, faujasite and erionite.

Further preferred embodiments of the zeolite component b) are mentioned under the manufacturing process.

The zeolite according to component b) of the present application may contain water. This content can be measured by the above mentioned method for the masterbatch.

Processing Aid

The polymer composition according to the present invention may also contain as component c) processing agents, that may be understood to assist the mixing of the zeolite component b) and the polymer component a). The higher the amount of zeolite gets the more beneficial is the use of such processing aids of the component c).

The processing aid c) of the composition according to the present invention is preferably selected from the group consisting of process oils, stearates and waxes. In particular the processing aid c) includes metal salts (e.g. zinc, magnesium and calcium) of saturated (e.g. stearic) and unsaturated (e.g. oleic) fatty acids, olefinic, paraffinic and other hydrocarbon waxes, hydrocarbon processing oils and vulcanized vegetable oil. In addition also colorants like dyestuffs or preferably pigments for identification purposes may also considered to be a processing aid c).

Preferably the polymer composition contains the component c) in the range from 0 to 10 wt %, in particular from 0 to 5 wt %, most preferably from 0 to 2 wt %, based on the polymer composition.

In a preferred polymer composition according to the present invention the amount of the zeolite component b) is from 20 to 90 wt %, in particular from 25 to 90 wt %. The preferred amount of component a) is from 10 to 80 wt %, preferably from 10 to 75 wt %, in particular from 10 to 65 wt %. The preferred amount of the optional processing aid c) is from 0 to 10 wt %, in particular from 0 to 5 wt %, more preferred from 0 to 2 wt % based on the polymeric polymer composition.

The elastomer composition according to the present invention is also referred to as "masterbatch". The invention also refers to a process for manufacturing the polymer composition according to present invention, where the components a), b) and optionally c) are mixed. In a preferred embodiment, the mixing process is performed in an internal mixer, in an extruder or on a mill. The at least one zeolite of component b) may optionally be introduced to the mixing process either before the addition of the at least one polymer of component a), at the same time, or after the at least one polymer of component a) has been added to the mixing process. Similarly the optional addition of a processing aid c) may be made at any point of the mixing process, dependent upon which addition time is deemed to be most beneficial to the mixing process.

During mixing, the mixture may also be heated. Preferably, mixing is performed by first kneading the polymer a) then adding the at least one zeolite of component b) with the optional at least one processing aid of component c).

The polymer composition prepared according to the invention can be recovered from the mixing process in bulk or shaped in the form of sheets, slabs or pellets. The shaping of the elastomeric composition can take place after mixing, as an individual shaping step.

In a preferred embodiment, the shaping of the elastomer composition is performed by milling, extrusion or calendering.

An advantage of the present invention is that the polymer composition is very stable during warehouse storage, and therefore retains a useful level of functionality with respect to its ability to activate a resin cure when compared to a zeolite powder similarly exposed to the same normal environmental conditions.

As far as the components a) and c) and its preferred embodiments are concerned for the manufacturing of the elastomer composition according to the present invention they are already described above. With regard to zeolite b) the moisture content of the zeolite used as starting material is preferably lower than 1.5 wt %. Until the end of the mixing of the zeolite with the polymer the zeolite may take up additional water from its surrounding environment. However, preferably the time from taking such a preferred dry zeolite from its sealed container or any other packing form in which it was provided that allows the moisture level to be maintained at a level preferably of less than 1.5 wt %, until the end of the mixing with the polymer shall preferably not take longer than one hour, preferably not longer than 45 minutes, in particular not longer than 30 minutes. This time limit is preferred in order to limit the water uptake of the zeolite to remain below a level that may adversely affect the function of the zeolite masterbatch composition. The final water content of the zeolite in the zeolite masterbatch composition of the invention is preferably smaller than 15 wt %, in particular less than 13 wt %.

In the context of the present application, the terminology "a zeolite having a moisture content of smaller than 1.5. wt %", is hereinafter also referred to as "activated zeolite". Typical examples for such readily absorbed molecules are low molecular weight polar compounds or hydrocarbons. However, the zeolite may comprise water molecules in the form of moisture as mentioned below. Adsorption of such molecules will result in a reduction of zeolite activation.

An activated zeolite can be obtained by subjection to a temperature and/or low pressure treatment such to substantially decompose and/or remove components from its pores. In a preferred embodiment activated zeolite is obtained by subjection to a temperature preferably of at least 170° C. and low pressure treatment, in particular at a pressure of less than 300 mm Hg, in particular by treating a zeolite at least 8 hours, preferably at least 12 hours, in particular at least 24 hours at a temperature of at least 170° C. at a pressure of less than 300 mm Hg, in particular less than 50 mm Hg, preferably less than 15 mm. The zeolite to be activated will be described below. An activated zeolite with a good activity can be obtained by a treatment of a commercially available zeolite, in particular a zeolite 5A in powder form at 180° C. and 10 mm Hg for 48 hours. A treatment may also consist of storing the zeolite for a period of 24 hours at 200° C. and at reduced pressure, whereby the preferred pressure is identified by the above given ranges. Such activation process of zeolites is well known to the person skilled in the art for producing a zeolite suited as a drying agent. Preferably the activated zeolite is dried zeolite having a water content of less than 0.5 wt % of water, preferably comprises 0 to 1 wt. %. In particular the activated zeolite does not contain acid halides above 0.1 wt %. Deactivation of the zeolite may proceed by diffusion of compounds such as for example water, hydrocarbons, acids or bases into the pores of the zeolite and driving out the potentially present inert gasses such as for example oxygen and nitrogen present from the activation process.

Accidental deactivation of the zeolite will take place if the activated zeolite is exposed to an environment from which it will absorb moisture and/or other compounds. It should be recognized that unintended deactivation by moisture is difficult to avoid in a rubber processing environment where the composition of the present invention is mainly prepared and used, and as a consequence, a significant deactivation of the activated zeolite especially by moisture is considered to fall under the scope of the present invention. Such deactivation of the zeolite comprised in the composition according to the invention by moisture might reach levels of 75%, preferably less than 50%, more preferably less than 25% of the maximum moisture deactivation under ambient conditions. Whereas moisture deactivation might be tolerated to a large extent the loading of the activated zeolite comprised in the composition of the present invention by compounds other than water is less than 5 wt %, preferably less than 3 wt %, more preferably less than 1 wt % compared to the activated zeolite.

U.S. Pat. No. 3,036,986 describes a method for accelerating the curing reaction of a butyl rubber formulation by use of a strong acid. Said strong acid is introduced into the formulation while contained within the pores of a crystalline, zeolitic molecular sieve adsorbent at loading levels of at least 5 wt. %.

To achieve a good dispersion of the zeolite compound b), the zeolite is preferably in the form of fine, small, dispersible particles that might be aggregated into larger agglomerates or processed into pellets. Generally the dispersed average particle size is in the range of 0.1-200 μm and more preferably the zeolite has an average particle size of 0.2-50 μm. This results in a large number of well dispersed sites within the polymer composition and also in the vulcanizable rubber composition obtained by the use of the inventive polymer composition providing the highest effect in increasing cure rate of the vulcanizable rubber composition and will not negatively affect surface quality of the shaped and vulcanized article.

The invention also refers to a process for manufacturing a vulcanizate wherein a vulcanizable rubber composition comprising
 i) an elastomeric polymer,
 ii) a phenol formaldehyde resin cross-linker and
 iii) an activator package
or its separate ingredients is mixed with an polymer composition according to the present invention, optionally shaped and then vulcanized.

The elastomeric polymer i) as of the vulcanizable rubber composition may be a R rubber, a M rubber or a mixture thereof. Such rubber types and preferred embodiments are described above.

In addition the elastomeric polymer component i) may also comprise polymers other than the above described elastomeric polymer. Such polymers other than the elastomeric polymer include, thermoplastic polymer in particular ethylene-based polymers, like high-ethylene polymers, such as high-density polyethylene (HDPE), low-density polyethylene (LDPE), linear, low-density polyethylene (LLDPE) and very-low-density polyethylene (VLDPE), and co-polymers of ethylene with butylene, hexene and octene (EBM, EHM and EOM plastomers), as well as propylene-based polymers like polypropylene or copolymers of propylene with ethylene (PEM) or a mixture thereof is preferred. Furthermore polyvinyl chloride, ethylene-vinyl acetate copolymers, polyvinyl acetate, polyamide, polyester, chlorinated polyethylene, urethane polymers, styrene polymers, silicone polymers, styrene-ethylene-butylen styrene block copolymers (SEBS), and epoxy resins may be present.

If as elastomers EPDM is used then as further rubber EPM is preferred.

Component ii) Phenol Formaldehyde Resin Cross-Linker

The term phenol formaldehyde resin cross-linker, phenolic resin, resin cross-linker or resol shall have identical meanings within this application and denote a phenol and formaldehyde based condensation product used as rubber curing agent.

Further are the terms cross-linking, curing and vulcanizing used with a singular meaning and are fully interchangeable words in the context of the present application, all expressing the thermosetting or fixation of a polymeric network by generation of covalent bonds between the rubber chains or its pedant groups.

The phenol formaldehyde resin cross-linker of component ii) can be present in the composition according to the invention as such, or can be formed in the composition by an in-situ process from phenol and phenol derivatives with aldehydes and aldehyde derivatives. Suitable examples of phenol derivatives include alkylated phenols, cresols, bisphenol A, resorcinol, melamine and formaldehyde, particularly in capped form as paraformaldehyde and as hexamethylene tetramine, as well as higher aldehydes, such as butyraldehyde, benzaldehyde, salicylaldehyde, acrolein, crotonaldehyde, acetaldehyde, glyoxilic acid, glyoxilic esters and glyoxal.

Resols based on alkylated phenol and/or resorcinol and formaldehyde are particularly suitable.

Examples of suitable phenolic resins are octyl-phenol formaldehyde curing resins. Commercial resins of this kind are for example Ribetak R7530E, delivered by Arkema, or SP1045, delivered by SI Group.

Good rubber products are obtained if 0.5-20 parts of a phenolic resin of the component ii) are present per 100 parts of elastomeric polymer i). Preferably 1-15 parts, more preferably 2-10 parts of phenolic resin are present.

In another preferred embodiment of the invention the phenol formaldehyde resin ii) is halogenated. Such halogenated resin represents the combined functionality of above phenolic resin and halogenated organic compound as described below. Preferred are brominated phenolic resins. A commercial resin of this kind is for example SP1055 (delivered by SI Group).

Component iii) Activator Package

The activator package comprises one or more accelerators or catalysts to work in conjunction with the phenolic resin.

The primary function of an accelerator in a rubber composition is to increase the rate of curing. Such agents may also affect the cross-lining density and corresponding physical properties of the vulcanized rubber composition, so that any accelerator additive should tend to improve such properties.

In a preferred embodiment of the invention the activator package iii) comprises a metal halide.

The metal halide accelerators of the invention are exemplified by such known acidic halides as tin chloride, zinc chloride, aluminum chloride and, in general, halides of the various metals of group 3 or higher of the periodic system of elements. This class includes, inter alia, ferrous chloride, chromium chloride and nickel chloride, as well as cobalt chloride, manganese chloride and copper chloride. The metal chlorides constitute a preferred class of accelerators in the composition of the invention. However, acceleration is obtainable with metal salts of other halides such as aluminum bromide and stannic iodide. Metal fluorides such as aluminum fluoride can accelerate, although aluminum fluoride is not particularly desirable. Of the metal chlorides, the most preferred are those of tin, zinc and aluminum.

The heavy metal halides are effective independently of the state of oxidation of the metal, and they are even effective if the halide is partially hydrolyzed, or is only a partial halide, as in zinc oxychloride.

In order to improve the preparation of the rubber composition, it is desirable that the metal halide is further coordinated with complexating agents such as water, alcohols and ethers. Such complexed metal halides have improved solubility and dispersability in the rubber compositions. A preferred example is tin dichloride dihydrate. The preferred amount of a metal halides as activator package iii) is from 0.25-5.0 parts, preferably 0.5 to 2 parts per 100 parts of elastomeric polymer i).

In another preferred embodiment of the invention the activator package iii) comprises a halogenated organic compound.

Suitable halogenated organic compounds are those compounds from which hydrogen halide is split off in the presence of a metal compound.

Halogenated organic compounds include, for example, polymers or copolymers of vinyl chloride and/or vinylidene chloride other polymerizable compounds, halogen containing plastics, for example polychloroprene; halogenated, for example chlorinated or brominated butyl rubber; halogenated or chlorosulphonated products of high-density or low-density polyethylene or higher polyolefins; colloidal mixtures of polyvinyl chloride with an acrylonitrile-butadiene copolymer; halogenated hydrocarbons containing halogen atoms which may be split off or which may split off hydrogen halide, for example liquid or solid chlorination products of paraffinic hydrocarbons of natural or synthetic origin; halogen containing factice, chlorinated acetic acids; acid halides, for example lauroyl, oleyl, stearyl or benzoyl chlorides or bromides, or compounds such as for example N-bromosuccinimide or N-bromo-phthalimide.

The preferred amount of a halogenated organic compounds as activator package iii) is from 0.5-10.0 parts, preferably 2 to 5 parts per 100 parts of elastomeric polymer i).

In one embodiment of the invention the activator package iii) further comprises a heavy metal oxide. In the context of the present invention a heavy metal is considered to be a metal with an atomic weight of at least 46 g/mol. Preferably the heavy metal oxide is zinc oxide, lead oxide or stannous oxide.

Such heavy metal oxide is recognized to be especially useful in combination with the above mentioned halogenated organic compound and/or halogenated phenolic resin. A further advantage described in the experiments of the present application is the moderation of the cure rate, e.g. scorch retardance, and the stabilization of the vulcanized compounds against thermal aging.

An advantage of the heavy metal oxide in the composition according to the present invention is an improved heat aging performance of the vulcanized rubber composition reflected by the retention of tensile properties after heat aging.

Good results are obtained with from 0.5-10.0 parts of heavy metal oxide per 100 parts of elastomeric polymer i). Preferably with 0.5-5.0, more preferably with 1-2 parts of heavy metal oxide. It is important to use a sufficient amount of heavy metal oxide, so to achieve an acceptable scorch time and good thermal stability of the vulcanized compound. If too much heavy metal oxide is used the cure rate will substantially deteriorate.

Preferably the activator package iii) is present in the rubber composition in an amount of 0.25-10.0 parts, preferably 0.25 to 5 parts per 100 parts of elastomeric polymer i).

The amount of polymer composition according to the present invention used to manufacture the vulcanizate is preferably in the range of 0.1 to 20 phr (parts per hundred parts rubber i)), more preferably from 0.5 to 15 phr and most preferred from 1 to 10 phr of the component i). The vulcanizable rubber composition may further comprise at least one cross-linking agent different from the phenol formaldehyde resin. A cross-linking agent different from the phenol formaldehyde resin may include, for example, sulfur, sulfur compounds e.g. 4,4'-dithiomorpholine; organic peroxides e.g. dicumyl peroxide; nitroso compounds e.g. p-dinitrosobenzene, bisazides and polyhydrosilanes. One or more cross-linking accelerators and/or coagents can be present to assist the cross-linking agents. Preferred are sulfur in combination with common accelerators or organic peroxides in combination with common coagents.

The presence of a further cross-linking agent may result in an improved state of cure of the rubber compound and improved vulcanized polymer properties. Such improvement may originate from a synergistic effect of the cross-linking agents, a dual network formation by each individual cross-linking agent or the cure incompatibility of a rubber phase in the case of a rubber blend.

In the case that further cross-linking agents are present in the vulcanizable rubber compositions, good results are obtained with from 0.1 to 20 parts by weight of further cross-linking agents per 100 parts by weight of elastomeric polymer. Preferably with 0.2 to 10 parts by weight, more preferably with 0.3 to 5 parts by weight of further cross-linking agents per 100 parts by weight of elastomeric polymer. If more than one further cross-linking agent is employed, the amount of further cross-linking agent mentioned before relates to the sum of the further cross-linking agents employed.

The vulcanizable rubber composition may in addition comprise processing aids, fillers and waxes.

Processing Aid

The processing aid includes, for example, stearic acid and its derivatives. These processing aids may be used alone or in combination of two or more kinds. In the case that processing aids are present in the vulcanizable rubber composition, the amount of the processing aid is in the range of, for example, 0.1 to 20 phr, or preferably 1 to 10 phr (parts per hundred parts rubber). If more than one processing aid is employed, the amount of processing aid mentioned before relates to the sum of the processing aids employed.

The fillers include, for example, carbon black, carbon nano tubes, inorganic fillers, such as calcium carbonate, magnesium carbonate, calcium hydroxide, magnesium hydroxide, aluminium hydroxide, silicic acid and salts thereof, clay, nano clays, talc, mica powder, bentonite, silica, alumina, aluminium silicate, acetylene black, and aluminium powder; organic fillers, such as cork, cellulose and other known fillers. These fillers may be used alone or in combination of two or more kinds.

Actually the mixing of the masterbatch according to the present invention with the vulcanizable rubber composition or its separate ingredients is considered to bring all components of the vulcanizable rubber composition and the polymer elastomer composition together for kneading.

The masterbatch is preferably added to the vuclanizable rubber composition or its ingredients in an amount of 1 to 20 phr based on the elastomeric polymer i), preferably from 5 to 10 phr calculated as 100% zeolite content.

Preferably the kneading is done in an internal mixer having either tangential or intermeshing rotors designed for the purpose of incorporating and dispersing rubber compounding ingredients, including fillers, softening agents, protective systems, activators and cure systems into a rubber matrix. Typically mixing proceeds for a time that is long enough to ensure good incorporation of all rubber compounding ingredients, while staying below a temperature above which vulcanisation of the cure system occurs. For resin cured compounds the mixing temperature should be in the range of 85 and 110° C., preferably of 90 and 95° C.

During kneading, the mixture may also be heated. Processing aids such as stearic acid may optionally be added before, during or after the addition of the phenol formaldehyde resin cross-linker and the activator package, depending on the desired improvement to the process. Whereas the addition of the phenol formaldehyde resin cross-linker, the activator package and any secondary cross-linking agent components can be done on the same mixing equipment, the cooling of the pre-mix and addition of these components is easily performed on a second mixing device such as a 2-roll mill. Such use of a second mixing device is advantageous where the control of temperature in the kneading process is difficult considering that the phenol formaldehyde resin cross-linker, the activator package and any secondary cross-linking agent components are heat sensitive and can thus be mixed to the composition at a lower temperature.

The vulcanizable rubber composition mixed with the elastomer composition according to the invention can be recovered from the mixing process in bulk or shaped in the form of sheets, slabs or pellets. The shaping of the elastomeric composition can take place after mixing, as an individual shaping step, ahead the vulcanization process or during the vulcanization process.

In a preferred embodiment, the shaping of the vulcanizable rubber composition is performed by extrusion, calendaring, compression molding, transfer molding or injection molding.

The vulcanizable rubber composition thus prepared is heated to a temperature at which the curing process takes place, so that a cross-linked rubber composition is obtained. A characteristic of the present invention is that the presence of an activated zeolite allows a reduction of the temperature at which the curing process takes place, resulting in a more economical process. Further will the lower vulcanization temperature result in less deterioration of the vulcanized rubber composition.

In a preferred embodiment the curing of the rubber composition is performed in a steam autoclave, an infra-red heater tunnel, a microwave tunnel, a hot air tunnel, a salt bath, a fluidized bed, a mold or any combination thereof.

An advantage of the present invention is that the vulcanization time of the vulcanizable rubber composition comprising a phenol formaldehyde resin cross-linker is between 5 seconds and 30 minutes and the vulcanization temperature is in the range between 120 and 250° C. More preferably the vulcanization time is between 15 seconds and 15 minutes and the vulcanization temperature is in the range between 140 and 240° C. Most preferably the vulcanization time is between 1 and 10 minutes and the vulcanization temperature is in the range between 160 and 220° C.

The curing processes can be performed in any equipment that is known and suitable for curing of a rubber composition. This can be done either in a static process, as well as in a dynamic process. In the first case, mention can be made to curing in a predetermined shape, or thermoforming, by the use of a heated shape.

Preferably, the dynamic process comprises a shaping e.g. by extrusion continuously feeding the shaped rubber composition to a curing section (e.g. hot air tunnel). When an extruder is used for the shaping of the rubber composition, the temperature should be carefully controlled in order to prevent premature vulcanization e.g. scorch. The mixture is then heated to conditions where the rubber composition is vulcanized.

Optionally the cured composition is subjected to a post cure treatment that further extends the vulcanization time.

The method for curing the rubber composition is not particularly limited to the above processes. Alternatively the composition can be shaped into a sheet using a calender, or the like, and then be cured in a steam autoclave. Alternatively, the rubber composition can be formed into a complex shape, such as an uneven shape, by injection molding, press forming, or other forming method, and then be cured.

Preferably the process according to the present invention is characterized in that the vulcanization is carried out by heating the vulcanizable rubber composition at normal ambient air pressure in the presence of oxygen.

This process option is preferably done in that the vulcanizable rubber composition thus prepared is heated in hot air at normal ambient air pressure, either as a batch process or by a process whereby the rubber composition is shaped and continuously conveyed through a hot air curing oven, to a temperature at which the curing process takes place, so that a cross-linked rubber composition is obtained. The preferred hot air curing temperatures are at 115 to 260° C., preferably at 160 and 220° C.

The invention also relates to a vulcanized article, prepared by the process according to the present invention.

A further particular advantage of the present invention is that the vulcanized articles prepared from the inventive masterbatch show a high final state of cure (MH). Further characteristics of a vulcanized article according to the present invention are low compression sets at both low (−25° C.) and high (150° C.) temperatures and high tensile strength. Another characteristic is the good heat aging stability of the vulcanized material expressed by only limited deterioration of the tensile properties upon prolonged temperature treatment.

Typical applications for a vulcanized article according to the present invention are in the automotive segment, e.g. exhaust hangers, front light seals, air hoses, sealing profiles, engine mounts, in the building and construction segment, e.g. seals building profiles and rubber sheeting and in general rubber goods, e.g. conveyor belts, rollers, chemical linings and textile reinforced flexible fabrications.

EXAMPLES

General Procedure

The zeolite/polymer masterbatch compositions of the examples were prepared using an internal mixer with a 3 liter capacity (Shaw K1 Mark IV Intermix) having intermeshing rotor blades and with a starting temperature of 25° C. The zeolite 5A was weighed no more than 10 minutes before mixing of the zeolite/polymer masterbatch. The elastomeric polymer was first introduced to the mixer and allowed to crumble for a period of 30 seconds using a rotor speed of 45 rpm before the addition of the zeolite 5A powder, being an aluminosilicate powder with a particle size of less than 50 μm, as supplied with a moisture content of below 1.5 wt %. Maintaining the same rotor speed mixing proceeded until a batch temperature of 140° C. was achieved for the 40 wt % masterbatch, taking a total mixing time of 8 minutes, and 155° C. for the 80 wt % masterbatch, taking a total mixing time of 13 minutes, when the batches were removed from the internal mixer and transferred to a two roll mill (Troester WNU 2) for cooling and forming into 5 mm thick sheets.

A sufficient amount of each of the zeolite/polymer masterbatch compositions was produced to allow repeated mixing of comparative experiments over the test period.

Within 24 hours of producing the zeolite/polymer compositions, both zeolite powder of the same quality as that used to produce the zeolite/polymer masterbatch, and the zeolite/polymer masterbatch were used to produce the initial examples and comparative experiment.

The vulcanizable rubber compositions of examples and comparative experiments were also prepared using an internal mixer with a 3 liter capacity (Shaw K1 Mark IV Intermix) having intermeshing rotor blades and with a starting temperature of 25° C. The elastomeric polymer was first introduced to the mixer and allowed to crumble for a period of 30 seconds using a rotor speed of 45 rpm before the carbon black, mineral oil and zeolite (either as a powder or as a zeolite/polymer masterbatch) were added. Mixing was allowed to proceed until a mix temperature of 70° C. was achieved, when the curing resin and activator were added. Further mixing was allowed to proceed until a mix temperature of 80° C. was achieved, when the rotor speed was reduced sufficiently to allow the mix temperature to be maintained at 80° C. for a period of 1 minute. The PE AC 617 wax and stearic acid were then added, and mixing proceeded for a further minute while the mix temperature was maintained at 80° C. The batches were then transferred to a two roll mill (Troester WNU 2) for cooling, and blending to achieve a high level of ingredient dispersion.

The balance of the zeolite/polymer masterbatch compositions and the zeolite powder not used to prepare the initial examples and comparative experiment were stored next to each other in an exposed state in a non-climate controlled storage area. After 3 months of storage, both the zeolite powder and the zeolite/polymer masterbatch compositions were used to produce new examples and comparative experiments.

The retention of zeolite functionality with respect to its ability to activate a resin cure was determined by comparison of the cure rheology of the examples and comparative experiment. Analysis of cure rheology was carried out using a moving die rheometer (MDR2000E) with test conditions of 20 minutes at 180° C. The cure characteristics are expressed in ML, MH, MH ML, ts2 and t'c(90), according to ISO 6502:1999.

The water content, of the masterbatch, can be determined by the following method: The test was carried out on a Mettler-Toledo TGA/DSC-1 Star System machine. 11 mg of sample is taken as received and weighed in the thermo balance of the TGA apparatus. The TGA test procedure starts as described and the weight loss is continuously monitored with time. Heating takes place in an inert atmosphere at a rate of 5° C./min up to 550° C. The amount of the residuals after this treatment is weighted.

Compositions of the zeolite/polymer masterbatches are given in table 1, wherein; IIR MB 40% represents a zeolite/polymer masterbatch containing 40 wt % zeolite mixed into butyl rubber.

IIR MB 80% represents a zeolite/polymer masterbatch containing 80 wt % zeolite mixed into butyl rubber EPDM MB 40% represents a zeolite/polymer masterbatch containing 40 wt % zeolite mixed into EPDM rubber.

EPDM MB 80% represents a zeolite/polymer masterbatch containing 80 wt % zeolite mixed into EPDM rubber

TABLE 1

|  | IIR MB 40% | IIR MB 80% | EPDM MB 40% | EPDM MB 80% |
|---|---|---|---|---|
| Lanxess Butyl 301[1] | 100 | 100 |  |  |
| Keltan EPDM 2470L[2] |  |  | 50 | 50 |
| Keltan EPDM 2650[3] |  |  | 50 | 50 |
| Zeolite 5A[4] | 67 | 400 | 66 | 400 |
| water content wt % (25-380° C.) | 4.1 | 8.9 | 4.3 | 9.5 |
| polymer content wt % (25-380° C.) | 59.7 | 19.9 | 59.3 | 20.2 |
| Residual content (wt %) | 35.8 | 70.4 | 36.1 | 70.1 |
| Wt % water (water/water + residual) | 10.3 | 11.2 | 10.6 | 11.9 |

[1]LANXESS Butyl 301; isobutylene-isoprene copolymer having a Mooney viscosity ML (1 + 8) at 125° C. of 51 +/− 5, a density of 0.92 g/cm3 and an unsaturation level of 1.85 +/− 0.2 mol %.
[2]Keltan 2470L supplied by LANXESS Elastomers: EPDM with a Mooney viscosity ML (1 + 4) at 125° C. of 22, C2 of 69 wt % and ENB unsaturation of 4.2 wt %
[3]Keltan 2650 supplied by LANXESS Elastomers: EPDM with a Mooney viscosity ML (1 + 4) at 25° C. of 25, C2 of 53 wt % and ENB unsaturation of 6 wt %
[4]water content of the zeolite 5A as starting material was 1.5 wt % and the time from taking such a dry material until the end of the mixing was 18 minutes for the 40 wt % masterbatches and 23 minutes for the 80 wt % masterbatches.

Table 2 shows Comparative Experiment A, which uses zeolite 5A powder having a moisture content of less than 1.5 wt %, and Examples 1, 2, 3 and 4, which use different versions of zeolite/polymer masterbatches. The retained activity of the zeolite used in comparative experiment A, compared with the zeolite/polymer masterbatches used in examples 1, 2, 3 and 4 over a three month period is shown in table 3.

The level of deterioration of the zeolite powder versus the various zeolite/polymer masterbatches with respect to their abilities to increase the activity of a resin cure is expressed as the difference between the rheological data obtained from the original (time zero) Comparative Experiment A and Examples 1, 2, 3 and 4, versus the rheological data obtained from remixed Comparative Experiment A and Examples 1, 2, 3 and 4 after the zeolite powder and zeolite/polymer masterbatches had been stored as described for three months.

It has been clearly shown that the deterioration of important cure characteristics, particularly scorch time (ts2), cure time (tc90) and cross-link density (MH-ML) after three months of storage of all versions of the zeolite/polymer masterbatches (MB) are significantly less than the differences observed from the zeolite power after storage for three month in identical storage conditions.

TABLE 2

| Example/Comparative Experiment | Comp. Exp. A | Expl. 1 | Expl. 2 | Expl. 3 | Expl. 4 |
|---|---|---|---|---|---|
| Keltan EPDM 8550[1] | 85 | 85 | 97.5 | 85 | 97.5 |
| Lanxess Butyl 301 | 15 |  |  |  |  |
| Carbon Black N550 | 70 | 70 | 70 | 70 | 70 |
| Hydrated Magnesium Silicate | 30 | 30 | 30 | 30 | 30 |
| Zeolite 5A[2] | 10 |  |  |  |  |
| IIR MB 40% |  | 25 |  |  |  |
| IIR MB 80% |  |  | 12.5 |  |  |
| EPDM MB 40% |  |  |  | 25 |  |
| EPDM MB 80% |  |  |  |  | 12.5 |
| Paraffinic process Oil[3] | 85 | 85 | 85 | 85 | 85 |
| Curing Resin SP-1045[4] | 10 | 10 | 10 | 10 | 10 |
| SnCl2.2H2O | 1.5 | 1.5 | 1.5 | 1.5 | 1.5 |
| PE AC 617 (PE wax)[5] | 4 | 4 | 4 | 4 | 4 |
| Stearic Acid | 1 | 1 | 1 | 1 | 1 |
| Total phr | 311.5 | 311.5 | 311.5 | 311.5 | 311.5 |

[1]Keltan 8550 supplied by LANXESS Elastomers: EPDM with a Mooney viscosity ML (1 + 4) at 125° C. of 80, C2 of 55 wt % and ENB unsaturation of 5.5 wt %
[2]water content of the zeolite 5A (provider Acros Organics) as starting material was 1.5 wt % and the time from taking such a dry material until the end of the mixing with the polymer was 21 minutes
[3]Sunpar 2280 from Sun Petroleum Products Co
[4]Resin SP-1045 (Provider S.I. Group)
[5]Low molecular weight polyethylene supplied by Allied International S.A.

TABLE 3

| Rheometer (MDR 2000E) | Comp. Exp. A | Expl. 1 | Expl. 2 | Expl. 3 | Expl. 4 |
|---|---|---|---|---|---|
| Original Results (Time zero) |  |  |  |  |  |
| ML [dNm] | 1.12 | 1.18 | 1.38 | 1.25 | 1.51 |
| MH [dNm] | 12.19 | 11.23 | 13.13 | 11.53 | 11.82 |
| MH-ML [dNm] | 11.07 | 10.05 | 11.75 | 10.28 | 10.31 |
| Ts2 [min] | 0.25 | 0.26 | 0.24 | 0.25 | 0.25 |
| Tc90 [min] | 4.83 | 2.71 | 4.96 | 2.63 | 2.93 |
| Results after 3 Months |  |  |  |  |  |
| ML [dNm] | 0.82 | 1.14 | 1.34 | 1.25 | 1.43 |
| MH [dNm] | 8.55 | 10.59 | 12.71 | 11.9 | 13.21 |
| MH-ML [dNm] | 7.73 | 9.45 | 11.37 | 10.65 | 11.78 |
| Ts2 [min] | 0.56 | 0.27 | 0.23 | 0.24 | 0.23 |
| Tc90 [min] | 8.26 | 3.00 | 4.61 | 2.4 | 3.06 |

TABLE 3-continued

| Rheometer (MDR 2000E) | Comp. Exp. A | Expl. 1 | Expl. 2 | Expl. 3 | Expl. 4 |
|---|---|---|---|---|---|
| Δ Results Over test Period | | | | | |
| ΔML [dNm] | −0.3 | −0.04 | −0.04 | 0.00 | −0.08 |
| ΔMH [dNm] | −3.64 | −0.64 | −0.42 | +0.37 | +1.39 |
| ΔMH-ML [dNm] | −3.34 | −0.6 | −0.38 | +0.37 | +1.47 |
| ΔTs2 [min] | +0.31 | +0.01 | −0.01 | −0.01 | −0.02 |
| ΔTc90 [min] | +3.43 | +0.29 | −0.35 | −0.23 | +0.13 |

The invention claimed is:

1. A polymer composition comprising:
   a) an elastomeric polymer, and
   b) a zeolite,
   whereby
   the total amount of the components a) and b) in the polymer composition is higher than 94 wt %,
   the total amount of water determined by TGA in the temperature range of 25 to 380° C. with a rate of 5° C./min is lower than 15 wt %, based on the amount of residuals obtained after the TGA measurement has been continued to 550° C., and
   the amount of the zeolite component b) is 20 to 90 wt %.

2. The composition according to claim 1, wherein the elastomeric polymer a) is selected from the group consisting of natural rubber (NR), polyisoprene rubber (IR), styrene-butadiene rubber (SBR), polychloroprene (CR), polybutadiene rubber (BR), nitrile rubber (NBR), carboxylated nitrile rubber (XNBR), butyl rubber (IIR), brominated isobutylene-isoprene copolymers with bromine contents of 0.1 to 10 wt. % (BIIR), chlorinated isobutylene-isoprene copolymers with chlorine contents of 0.1 to 10 wt. % (CIIR), hydrogenated or partially hydrogenated nitrile rubber (HNBR), styrene-isoprene-butadiene rubber (SIBR), styrene-butadiene-acrylonitrile rubber (SNBR), ethylene propylene diene rubber (EPDM), ethylene propylene copolymer (EPM), ethylene vinyl acetate rubber (EVM), silicone rubber (QM), fluoro elastomer (FKM), ethylene acrylate rubber (AEM), chlorinated polyethylene (CM), and chlorosutfonated rubber (CSM), and a mixture thereof.

3. The composition according to claim 1, further comprising up to a maximum of 10 wt % of a processing aid component c) based on the polymer composition, which processing aid is selected from the group consisting of metal salts of saturated and unsaturated fatty acids, olefinic, paraffinic and other hydrocarbon waxes, hydrocarbon processing oils and vulcanized vegetable oil.

4. The composition according to claim 1, wherein the zeolite component b) has pore openings of approximately 2 to 10 Ångstrom.

5. A process for manufacturing an elastomer composition according to claim 1, the process comprising mixing the components a) and b).

6. A process for vulcanization of a rubber composition, the process comprising:
   mixing the polymer composition according to claim 1 with:
      i) an elastomeric polymer,
      ii) a phenol formaldehyde resin cross-linker, and
      iii) an activator package;
      wherein at least two or all of the components i), ii), and iii) are individually mixed with the polymer composition, or are premixed prior to mixing with the polymer composition to produce a mixture,
   optionally shaping the mixture, and
   vulcanizing the mixture.

7. A polymer composition comprising:
   a) an elastomeric polymer and
   b) a zeolite,
   whereby
   the total amount of the components a) and b) in the polymer composition is higher than 98 wt %,
   the total amount of water determined by TGA in the temperature range of 25 to 380° C. with a rate of 5° C./min is lower than 15 wt % based on the amount of residuals obtained after the TGA measurement has been continued to 550° C., and
   the amount of the zeolite component b) is 25 to 90 wt %.

8. The composition according to claim 7, wherein the zeolites are potassium, sodium and/or calcium forms of zeolite A types having a pore opening of 3 to 5 Ångstrom.

9. The composition according to claim 8, wherein the composition comprises:
   10 to 65 wt % of the elastomeric polymer;
   25 to 90 wt % of the zeolite; and
   0 to 2 wt % of a processing aid,
   based on the polymer composition.

10. The composition according to claim 9, wherein the zeolite has an average particle size of 0.2-50 μm, and a moisture content of less than 1.5 wt %.

* * * * *